(12) United States Patent
Hodoshima

(10) Patent No.: US 7,657,248 B2
(45) Date of Patent: Feb. 2, 2010

(54) WIRELESS LAN SYSTEM, WIRELESS LAN ACCESS POINT, WIRELESS LAN TERMINAL AND ACTIVATION CONTROL METHOD FOR USE THEREWITH

(75) Inventor: Takeshi Hodoshima, Kanagawa (JP)

(73) Assignee: Nec Infrontia Corporation, Kanagawa (JP)

( * ) Notice: Subject to any disclaimer, the term of this patent is extended or adjusted under 35 U.S.C. 154(b) by 287 days.

(21) Appl. No.: 11/204,021

(22) Filed: Aug. 16, 2005

(65) Prior Publication Data

US 2006/0039337 A1 Feb. 23, 2006

(30) Foreign Application Priority Data

Aug. 18, 2004 (JP) ............................. 2004-237827

(51) Int. Cl.
*H04B 1/16* (2006.01)
*G08C 17/00* (2006.01)
(52) U.S. Cl. .................... 455/343.2; 370/311; 370/350; 370/338; 455/502; 455/455
(58) Field of Classification Search ................. 370/338, 370/310; 455/448, 574, 127.1, 127.5
See application file for complete search history.

(56) References Cited

U.S. PATENT DOCUMENTS

| 6,192,230 B1 * | 2/2001 | van Bokhorst et al. ... | 455/343.3 |
| 6,665,520 B2 * | 12/2003 | Romans ..................... | 455/13.4 |
| 2002/0132603 A1 * | 9/2002 | Lindskog et al. ........... | 455/343 |
| 2002/0132612 A1 * | 9/2002 | Ishii ........................... | 455/414 |
| 2004/0008652 A1 * | 1/2004 | Tanzella et al. ............. | 370/338 |
| 2005/0180367 A1 * | 8/2005 | Dooley et al. ............... | 370/338 |
| 2005/0215274 A1 * | 9/2005 | Matson et al. .............. | 455/522 |

FOREIGN PATENT DOCUMENTS

| JP | 10-69448 A | 3/1998 |
| JP | H11-345205 A | 12/1999 |
| JP | 2000-215167 A | 8/2000 |
| JP | 2004-96285 A | 3/2004 |

OTHER PUBLICATIONS

"6. Principle of operation"—"Port-Based Network Access Control", IEEE802.1x, Jun. 14, 2001.

* cited by examiner

*Primary Examiner*—Nick Corsaro
*Assistant Examiner*—Joel Ajayi
(74) *Attorney, Agent, or Firm*—Sughrue Mion, PLLC

(57) ABSTRACT

To provide a wireless system in which a terminal that is shutdown or on in standby can be activated from a remote site in an environment where connection is attested by an authentication server, using security technology for wireless LAN, a different encryption key from other terminals is employed in the communication, and the encryption key is periodically renewed. An access point controls a beacon transmission interval control part by recognizing a terminal activation signal from a management terminal. The beacon transmission interval control part controls the transmission interval of beacon by switching between a normal operation mode and a patterned transmission interval mode. A beacon transmission interval detection circuit of a terminal monitors interval between beacons, and upon detecting patterned beacons, outputs a detection signal. A wireless module receives the detection signal from the beacon transmission interval detection circuit, and then makes an activation request to the terminal.

14 Claims, 2 Drawing Sheets

WIRELESS LAN SYSTEM, WIRELESS LAN ACCESS POINT, WIRELESS LAN TERMINAL AND ACTIVATION CONTROL METHOD FOR USE THEREWITH

BACKGROUND OF THE INVENTION

1. Field of the Invention

The present invention relates to a wireless LAN system, a wireless LAN access point, a wireless LAN terminal and an activation control method useful for them, and more particularly, to a wireless LAN system for activating a wireless LAN (Local Area Network) terminal that is shut down or on standby upon an instruction from a management terminal even in the case of using a security such as IEEE (Institute of Electrical and Electronic Engineers) 802.1x in a wireless section.

2. Description of the Related Art

There is a technology that is called "Wake on LAN", for example, in the existing LAN. In this technology, to activate a wireless LAN terminal that is shut down or on standby from a remote site, a signal of activation instruction is issued from a management terminal, and if only a wireless LAN module is in the operated condition even when the terminal is shut down or on standby, the wireless LAN module receiving the activation instruction signal sends the activation instruction signal to the terminal mounting the module.

The terminal receiving this activation instruction signal transfers from the shutdown or standby state to the operated state (active state). In this case, there is a technology for implementing the remote management while the security by a password function is maintained, even if the terminal is provided with the password function for preventing the illegal use of the third party (e.g., refer to Japanese Patent Laid-Open Nos. 11-345205 and 2000-215167).

It is pointed out that there is possibility that the data encrypted by a WEP (Wired Equivalent Privacy) key employed for the wireless LAN is analyzed, and also there is danger that all the data communications via the wireless LAN are analyzed because the WEP key is analyzed.

To exclude these dangers as much as possible, it is necessary for the data communication via the wireless base station to make the user authentication named the IEEE (Institute of Electrical and Electronic Engineers) 802.1x authentication (e.g., refer to "6. Principle of operation" ("Port-Based Network Access Control", IEEE 802.1x, Jun. 14, 2001)). Moreover, there are many cases employing the method of dynamically generating and periodically changing the encryption key for data encryption in the wireless LAN.

In the conventional wireless LAN system, when the security technology for wireless LAN such as IEEE 802.1x authentication is used, the connection is attested by an authentication server, a different encryption key from other terminals is employed in the communication, and the encryption key is renewed regularly. In this technology, there is a case where the activation instruction signal may not be received by the wireless LAN terminal.

When the security technology for the wireless LAN is used, the authentication with the authentication server is implemented, employing a driver and the authentication software of the wireless LAN terminal mounting the wireless LAN module, and a digital certificate provided for the wireless LAN terminal, but can not be achieved only by the wireless LAN module simplex.

Therefore, when the encryption key is renewed while the wireless LAN terminal is shut down or on standby, or when the authentication period expires and the authentication is needed again, the wireless LAN terminal can not communicate with the wireless LAN access point, and receive the activation instruction signal.

Also, in the conventional wireless LAN system, when the security technology for the wireless LAN is used in the environment where there are a plurality of connectable wireless LAN access points, there is a case where the wireless LAN terminal can not receive the activation instruction signal.

When the security technology for the wireless LAN is used, the authentication with the authentication server can not be achieved only by the wireless LAN module simplex, as in the above. Also, the wireless LAN terminal may make a roaming due to movement of the wireless LAN terminal or variations in the ambient environment while the terminal is shut down or on standby.

In this case, the authentication with the authentication server is required in the roaming, but since the wireless LAN terminal is shut down, the authentication with the authentication server can not be achieved, disabling the communication, so that the activation instruction signal cannot be received. The above problems can not be solved using the technologies as described in Japanese Patent Laid-Open Nos. 11-345205 and 2000-215167.

BRIEF SUMMARY OF THE INVENTION

The invention has been achieved to solve the above-mentioned problems and it is an object of the invention to provide a wireless LAN system, a wireless LAN access point, a wireless LAN terminal and an activation control method useful for them in which the wireless LAN terminal that is shut down or on standby can be controlled and activated from a remote site even in the environment where the connection is attested by the authentication server, using the security technology for wireless LAN, a different encryption key from other terminals is employed in the communication, and the encryption key is periodically renewed.

The present invention provides a wireless LAN (Local Area Network) system for activating a wireless LAN terminal in either a shutdown or standby state upon an instruction via a wireless LAN access point from a remote management terminal in a network using a security technology for wireless LAN, the wireless LAN access point comprising control means issuing the activation instruction to the wireless LAN terminal using an unencrypted beacon.

The invention provides a wireless LAN (Local Area Network) access point for use in a wireless LAN system for activating a wireless LAN terminal in either a shutdown or standby state upon an instruction from a remote management terminal in a network using a security technology for wireless LAN, the access point comprising control means issuing the activation instruction to the wireless LAN terminal using an unencrypted beacon.

The invention provides a wireless LAN (Local Area Network) terminal that is activated in either a shutdown or standby state upon an instruction via a wireless LAN access point from a remote management terminal in a network using a security technology for wireless LAN, the wireless LAN terminal comprising detection means detecting an unencrypted beacon from the wireless LAN access point, wherein the wireless LAN terminal is activated based on the detected beacon.

The invention provides an activation control method for use with a wireless LAN (Local Area Network) system for activating a wireless LAN terminal in either a shutdown or standby state upon an instruction via a wireless LAN access point from a remote management terminal in a network using a security technology for wireless LAN, the method comprising a control step of issuing the activation instruction from the wireless LAN access point to the wireless LAN terminal using an unencrypted beacon.

That is, in the wireless LAN (Local Area Network) system according to the invention, the wireless LAN access point comprises a beacon transmission interval control part for transmitting beacons to the wireless LAN terminal at a regular interval in the normal state, and transmits beacons to the wireless LAN terminal at a patterned interval only when receiving a terminal activation instruction signal.

Herein, the wireless LAN access point indicates a connection point for connecting the wireless LAN terminal using a communication service to the network of a carrier, or a key station of the wireless LAN that becomes a gateway to the wire LAN. Also, the beacon transmitted at the regular interval in the normal time is a frame for notifying the function that the wireless LAN access point supports for the wireless LAN terminal or ID (SSID: Service Set Identifier) of BSA (Basic Service Area).

The wireless LAN module mounted at the wireless LAN terminal comprises a patterned beacon transmission interval detection circuit, which has a function of detecting the beacons in which the beacon transmission interval is patterned (patterned beacons). The wireless LAN module makes an activation request to the wireless LAN terminal upon detecting the patterned beacons. At the same time, it has a function of newly making a connection request of the wireless LAN terminal to the wireless LAN access point.

The management terminal transmits a terminal activation instruction signal of instructing the activation of the wireless LAN terminal to the wireless LAN access point to activate the wireless LAN terminal that is shut down or on standby. The wireless LAN access point changes the transmission of beacon issued at the regular interval by the beacon transmission interval control part to the transmission of beacon at the patterned interval, upon receiving the terminal activation instruction signal.

The wireless LAN module always monitors the beacon transmission interval from the wireless LAN access point, when the wireless LAN terminal is in the shutdown or standby state, and prompts the wireless LAN terminal to be activated, if the patterned beacon transmission interval is detected by the patterned beacon transmission interval detection circuit. At the same time, the wireless LAN module makes a connection request to the wireless LAN access point, and then transfers to a normal connection process. In the normal connection process, the wireless LAN terminal can acquire the authentication or encryption key, and make further communication.

Also, if the wireless LAN module detects a roaming in the state where the wireless LAN terminal is shut down or on standby, it does not make the connection operation to the wireless LAN access point of roaming destination, but monitors only the beacon originated from the wireless LAN access point of roaming destination and then prompts the wireless LAN terminal to be activated upon detecting the patterned beacon transmission interval, to enter the same connection operation as the above connection operation. Herein, the roaming means the movement of the wireless LAN terminal between a plurality of BSAs.

Thereby, in the wireless LAN system according to the invention, the wireless LAN terminal that is shut down or on standby can be controlled and activated from the remote site even in the environment where the connection is attested by the authentication server using the security technology for wireless LAN, a different encryption key from other terminals is employed in the communication, and the encryption key is renewed periodically.

That is, in the wireless LAN system according to the invention, the wireless LAN terminal is activated using the unencrypted beacon, whereby it is unnecessary to change the encryption key or make the reauthentication, so that it is possible to perform the Wake on LAN to recover the wireless LAN terminal from the shutdown or standby in the wireless LAN using the security technology for wireless LAN such as IEEE (Institute of Electrical and Electronic Engineers) 802.1x.

Usually, when the security technology for wireless LAN such as IEEE 802.1x is used, the encryption key in the wireless section is periodically changed, or the authentication with the authentication server is periodically performed. In this case, when the encryption key is rewritten or the authentication operation is performed, the wireless LAN module simplex can not perform those operations, whereby the OS (Operating System) or software of the wireless LAN terminal mounting the wireless LAN module is needed. Also, when the authentication with the authentication server is made by the digital certificate, the storage device of the wireless LAN terminal main body is needed.

Also, in the wireless LAN system according to the invention, because the wireless LAN terminal is activated using the unencrypted beacon, whereby it is unnecessary to change the encryption key or make the reauthentication, as described above, so that the Wake on LAN can be performed to recover the wireless LAN terminal from the shutdown or standby even if a roaming occurs while the wireless LAN terminal is shut down or on standby.

Usually, in the network using the security technology for wireless LAN, the authentication is made again at the time of roaming, and the wireless LAN module simplex can not perform those operations.

DETAILED DESCRIPTION OF THE PREFERRED EMBODIMENTS

Figure 1:
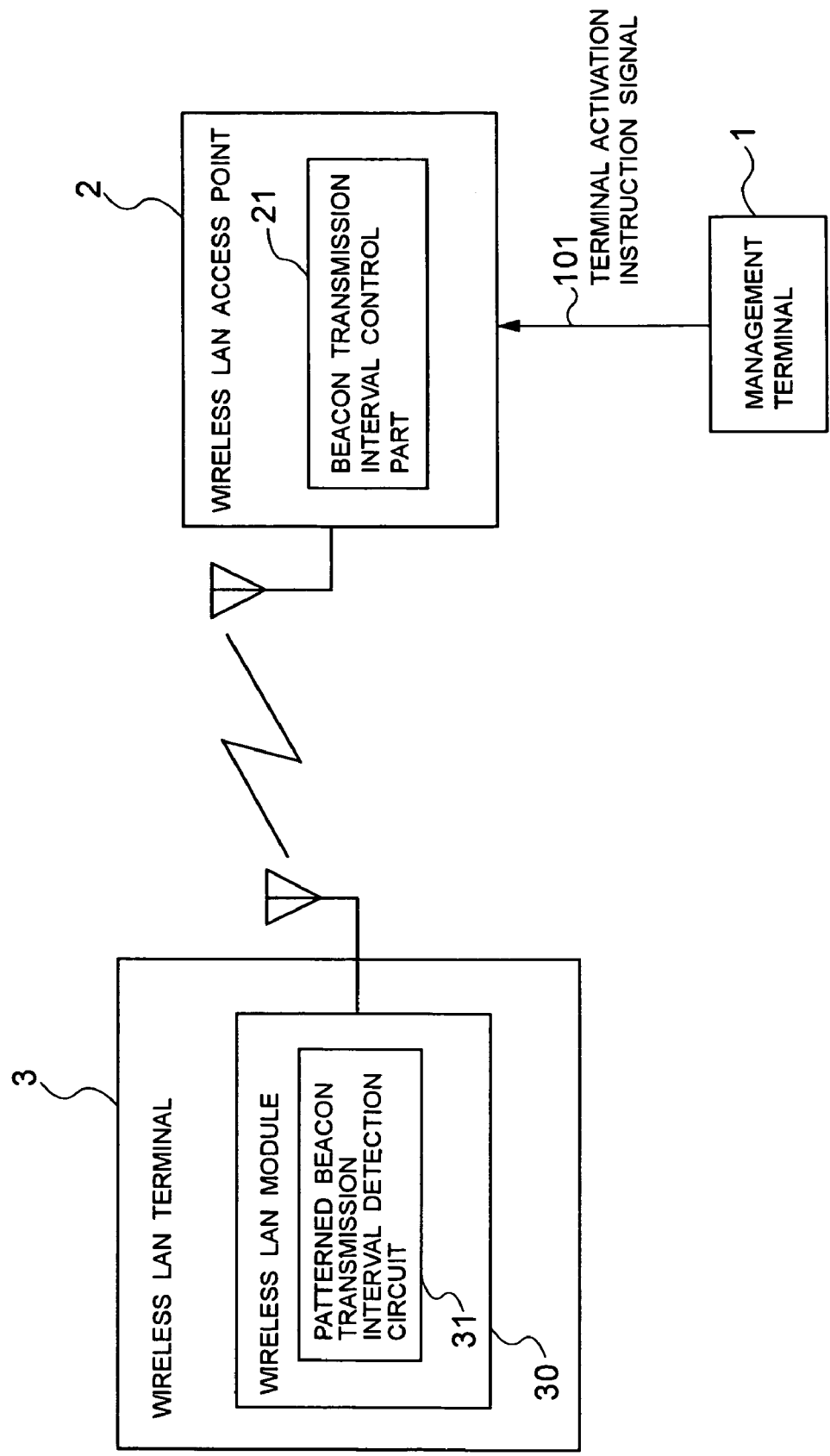
FIG. 1 is a block diagram showing the configuration of a wireless LAN system according to an embodiment of the present invention.

The preferred embodiments of the present invention will be described below with reference to the drawings. FIG. 1 is a block diagram showing the configuration of a wireless LAN (Local Area Network) system according to an embodiment of the invention. In FIG. 1, the wireless LAN system according to the embodiment of the invention comprises a management terminal 1, a wireless LAN access point 2, and a wireless LAN terminal 3.

The management terminal 1 manages the power activation control for the wireless LAN terminal 3, and transmits a terminal activation instruction signal 101 to the wireless LAN access point 2, when it is required to activate the wireless LAN terminal 3 that is shut down or on standby.

For example, the terminal activation instruction signal 101 is the signal of SNMP (Simple Network Management Protocol) using MIB (Management Information Base) intrinsic to the wireless LAN access point 2. On receiving the terminal activation instruction signal 101, the wireless LAN access point 2 patterns the beacon transmission interval.

The wireless LAN access point 2 comprises a beacon transmission interval control part 21 for patterning the beacon transmission interval, and controls the beacon transmission interval control part 21 by recognizing the terminal activation instruction signal 101. Herein, the wireless LAN access point 2 indicates a connection point for connecting the wireless LAN terminal 3 using a communication service to a network of carrier, or a key station for the wireless LAN that becomes a gateway to the wire LAN.

Also, the beacon transmitted at a regular interval in the normal time is a frame for notifying the function that the wireless LAN access point 2 supports for the wireless LAN terminal or ID (SSID: Service Set Identifier) of BSA (Basic Service Area).

The beacon transmission interval control part 21 controls the transmission interval of beacon by switching between a normal operation mode and a patterned transmission interval mode upon an instruction from the wireless LAN access point 2. In the normal operation mode, when the wireless LAN access point 2 is set to a transmission interval of 100 ms, for example, the beacon is transmitted at a regular interval of once per 100 ms. In the patterned transmission interval mode, the beacon is repeatedly transmitted at the intervals of 200 ms and 300 ms alternately, such as twice at the interval of 200 ms, then twice at the interval of 300 ms, and twice at the interval of 200 ms.

The wireless LAN terminal 3 mounts a wireless LAN module 30. Also, the wireless LAN terminal 3 has a function of always supplying the power to the wireless LAN module 30, when the terminal is shut down or on standby, even though a CPU (Central Processing Unit), a storage device or a power source of the terminal main body is stopped.

Moreover, the wireless LAN terminal 3 has a function of starting the activation of the terminal upon an activation request from the wireless LAN module 30, even though the terminal is in the state of shutdown or standby.

The wireless LAN module 30 comprises a patterned beacon transmission interval detection circuit 31, and has a function of making an activation request to the wireless LAN terminal 3 as well as making a connection request to the wireless LAN access point 2, upon receiving a detection signal from the patterned beacon transmission interval detection circuit 31, and transferring to a normal connection process.

Also, the wireless LAN module 30 has a function of keeping on receiving the beacons from the wireless LAN access point 2 of movement destination, without performing the normal roaming operation, even if a roaming is detected when the wireless LAN terminal 3 is shut down or on standby, and transferring to a normal connection process upon receiving a detection signal from the patterned beacon transmission interval detection circuit 31.

The patterned beacon transmission interval detection circuit 31 always monitors the beacon transmission interval in the state where the wireless LAN terminal 3 is shut down or on standby. For example, if the beacon transmission interval is 100 ms, "0" is discriminated; if the beacon transmission interval is 200 ms, "A" is discriminated; and if the beacon transmission interval is 300 ms, "B" is discriminated.

As described above, when the wireless LAN access point 2 transmits beacon at a regular interval of 100 ms, then twice at an interval of 200 ms, and twice at an interval of 300 ms, the patterned beacon transmission interval detection circuit 31 discriminates "0", . . . , "0", "A", "A", "B", "B", "0", . . . , "0". When "A" and "B" are repeated each twice, a detection signal is outputted to the wireless LAN module 30.

Figure 2:
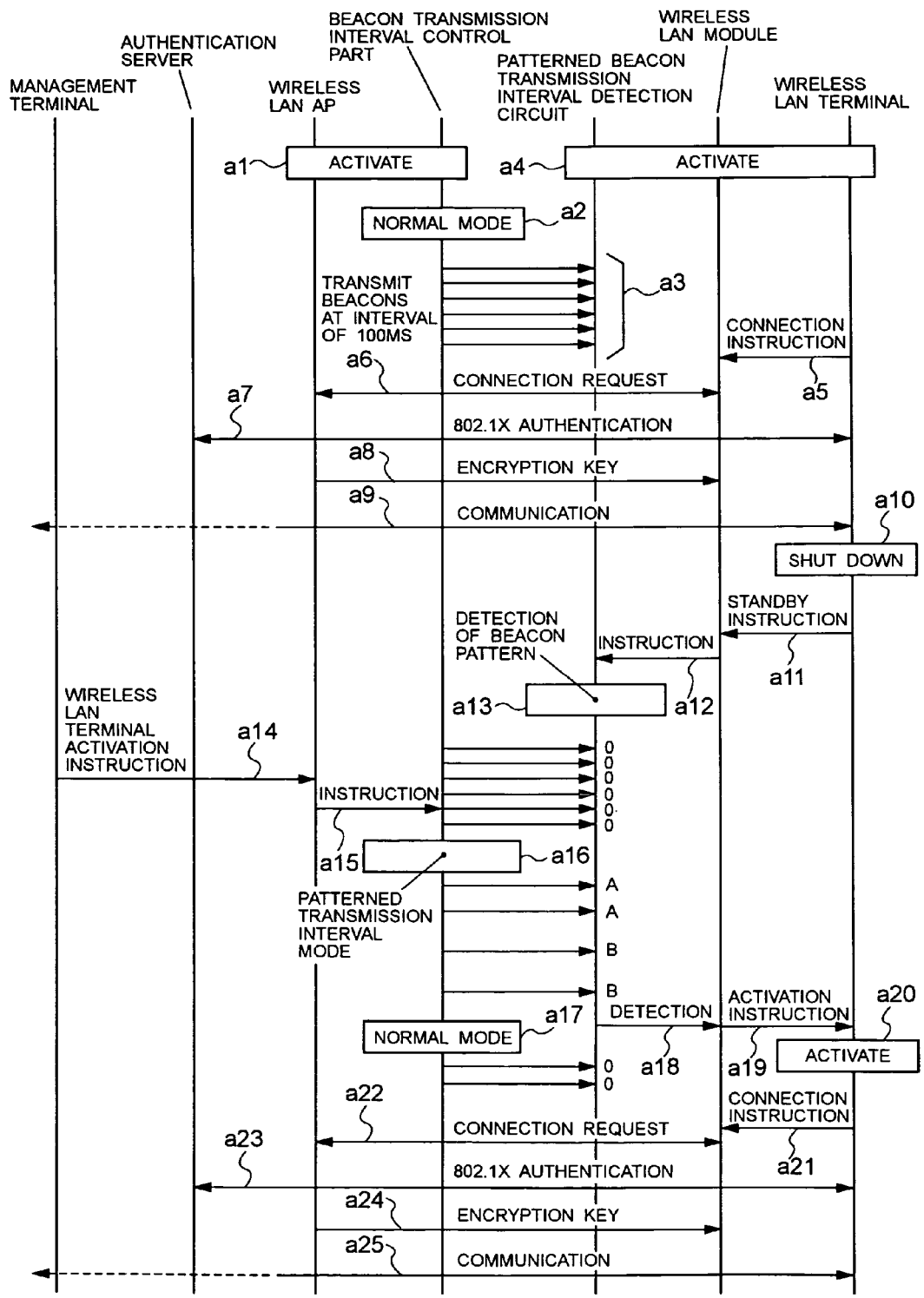
FIG. 2 is a sequence chart showing an activation control in the wireless LAN system according to the embodiment of the invention.

FIG. 2 is a sequence chart showing the activation control in the wireless LAN system according to the embodiment of the invention. Referring to FIGS. 1 and 2, the activation control in the wireless LAN system according to the embodiment of the invention will be described below.

The wireless LAN access point 2 makes the normal activation (a1 of FIG. 2), and then sends out the beacon in the normal operation mode (a2, a3 of FIG. 2). In this case, for example, the beacon transmission interval in the normal operation mode is 100 ms.

The wireless LAN terminal 3 makes the normal activation (a4 of FIG. 2), and then issues a connection instruction of the wireless LAN to the wireless LAN module 30 as normally (a5 of FIG. 2). The wireless LAN module 30 receiving the connection instruction makes a connection request to the wireless LAN access point 2 (a6 of FIG. 2).

Thereafter, the wireless LAN terminal 3 conducts the IEEE 802.1x authentication with an IEEE 802.1x authentication server (a7 of FIG. 2), acquires the encryption key finally (a8 of FIG. 2), and starts the communication when the connection to the network is enabled (a9 of FIG. 2). At this time, the patterned beacon transmission interval detection circuit 31 does not perform the detection of beacon pattern.

The wireless LAN terminal 3 is shut down or placed on standby (a10 of FIG. 2), when the operation is ended, whereby the CPU, the storage device and the internal power source are stopped. At this time, the wireless LAN module 30 is always supplied with electric power and placed in an operated state. When the wireless LAN terminal 3 is shut down or placed on standby, it issues a standby instruction to prompt preparations for receiving the activation instruction to the wireless LAN module 31 (a11 of FIG. 2).

The wireless LAN module 30 receives the standby instruction, and then makes a pattern standby instruction to the patterned beacon transmission interval detection circuit 31 (a12 of FIG. 2). The patterned beacon transmission interval detection circuit 31 receives the pattern standby instruction, and then operates a pattern detection circuit, not shown, to detect the pattern of beacon on standby (a13 of FIG. 2).

When the wireless LAN terminal 3 that is shut down or on standby is activated from the remote site, the management terminal 1 makes a wireless LAN terminal activation instruction to the wireless LAN access point 2 (a14 of FIG. 2). The wireless LAN access point 2 receives the wireless LAN terminal activation instruction, and then makes a beacon patterning instruction to the beacon transmission interval control part 21 (a15 of FIG. 2).

The beacon transmission interval control part 21 receives the beacon patterning instruction, and then becomes in the patterned transmission interval mode, whereby the transmission interval of beacon that is transmitted at an interval of 100 ms in the normal operation mode is changed (a16, a17 of FIG. 2). In this case, the beacon transmission interval control part 21 sends out the first beacon in the pattern mode after 200 ms, the second beacon after 200 ms, the third beacon after 300 ms, and the fourth beacon after 300 ms, and sends out the beacon at the interval of 100 ms in the normal mode again, for example.

Because the beacon is radio wave, and the wireless LAN terminal 3 may not receive all the beacons securely, the probability that the wireless LAN terminal 3 can identify the patterned beacons is increased by repeating this patterned transmission interval mode several times.

On the other hand, the patterned beacon transmission interval detection circuit 31 receives all the beacons, and confirms the presence or absence of beacon at every 100 ms. The patterned beacon transmission interval detection circuit 31 has the pattern detection circuit which detects the pattern as "0" when the next beacon is received in 100 ms from the previous beacon, "A" when the next beacon is received in 200 ms from the previous beacon, or "B" when the next beacon is received in 300 ms from the previous beacon.

As a result, if the patterned beacon transmission interval detection circuit 31 detects a consecutive pattern of "A, A, B, B", it is judged as the patterned beacons, and the detection signal is outputted to the wireless LAN module 30 (a18 of FIG. 2). The wireless LAN module 30 receives the detection signal, and then makes an activation instruction to the wireless LAN terminal 3 (a19 of FIG. 2).

When the operation of the wireless LAN access point 2 is stopped, the wireless LAN module 30 cannot receive the beacon, the connection between the wireless LAN terminal 3 and the wireless LAN access point 2 is disconnected once, and then the wireless LAN module 30 can receive the beacon again, or when a roaming is made to another wireless LAN access point, the wireless LAN module 30 does not make a connection request to the wireless LAN access point 2 to be reconnected or a wireless LAN access point of roaming destination, but keeps on receiving only the beacons from the wireless LAN access point 2 to be reconnected or the wireless LAN access point of roaming destination to detect the patterned beacons by the patterned beacon transmission interval detection circuit 31.

If receiving the activation instruction, the wireless LAN terminal 3 starts the activation (a20 of FIG. 2), makes a connection instruction to the wireless LAN module 30 (a21 of FIG. 2), and starts the connection in the same manner as in the normal activation (a22 to a25 of FIG. 2).

In this way, since the wireless LAN terminal 3 is activated using the unencrypted beacon, it is unnecessary to change the encryption key or make the reauthentication, whereby it is possible to perform the Wake on LAN for recovering the wireless LAN terminal 3 from shutdown or standby in the wireless LAN using the security technology such as IEEE 802.1x.

Normally, using the security technology such as IEEE 802.1x, the encryption key in the wireless section is periodically changed, or the authentication is periodically performed with the authentication server. When the encryption key is rewritten or the authentication operation is performed, the wireless LAN module 30 simplex can not perform those operations, whereby the OS (Operating System) or software of the wireless LAN terminal mounting the wireless LAN module 30 is needed. Also, when the authentication is made with a digital certificate, the storage device for the wireless LAN terminal main body is needed. In this embodiment, the above restrictions are unnecessary.

Also, in this embodiment, since the wireless LAN terminal 3 is activated using the unencrypted beacon, it is unnecessary to change the encryption key or make the reauthentication, whereby even if a roaming occurs while the wireless LAN terminal 3 is shut down or on standby, it is possible to perform the Wake on LAN for recovering the wireless LAN terminal 3 from the shutdown or standby.

Normally, in the network using the security technology for wireless LAN, the authentication is made again at the time of roaming, but can not be made by the wireless LAN module simplex. However, this restriction is unnecessary in this embodiment.

What is claimed is:

1. A wireless Local Area Network (LAN) system for activating a wireless terminal which is in a shutdown state or a standby state, said wireless LAN system employing an encryption key that is periodically changed, the wireless LAN system comprising:
    an access point; and
    a remote management terminal configured to transmit a first activation instruction to the access point to activate the wireless terminal;
    said access point comprises a control circuit which, in response to receiving the transmitted first activation instruction, transmits a second activation instruction to said wireless terminal while the wireless terminal is in the shutdown state or the standby state;
    the second activation instruction comprising an unencrypted beacon;
    the control circuit configured to transmit the unencrypted beacon at a predetermined regular rate during a normal mode of operation;
    said control circuit transmits the second activation instruction to said wireless terminal by changing a transmission interval of said unencrypted beacon;
    said unencrypted beacon is a frame for transmitting a Service Set Identifier (SSID) of a Basic Service Area (BSA) in a wireless section of the wireless LAN system which is encrypted using the encryption key.

2. The wireless LAN system according to claim 1, wherein said wireless terminal comprises a detection circuit which detects the second activation instruction transmitted by said control circuit based on the changed transmission interval.

3. The wireless LAN system according to claim 2, wherein said detection circuit transmits a third activation instruction to said wireless terminal if the second activation signal transmitted by the control circuit is detected.

4. The wireless LAN system according to claim 2, wherein said detection circuit is disposed in a wireless module that is active when said wireless terminal is in said shutdown state or standby state.

5. The wireless LAN system according to claim 4, wherein said wireless module receives beacons without making a connection request to said access point or another access point of a roaming destination even if any one of reconnection and roaming occurs in the connection to said access point, when said wireless terminal is in either said shutdown or standby state.

6. A wireless access point for use in a wireless Local Area Network (LAN) system for activating a wireless terminal which is in a shutdown state or a standby state in response to receiving an activation instruction from a remote management terminal in the wireless LAN system, said wireless LAN system employing an encryption key that is periodically changed, said wireless access point comprising:
    a control circuit which, in response to receiving the activation instruction from the remote management terminal, transmits the activation instruction to said wireless terminal using an unencrypted beacon while the wireless terminal is in the shutdown state or the standby state;
    the control circuit transmits the unencrypted beacon at a predetermined regular rate during a normal mode of operation;
    said control circuit transmits the activation instruction to said wireless terminal by changing a transmission interval of said unencrypted beacon;
    said unencrypted beacon is a frame for transmitting a Service Set Identifier (SSID) of a Basic Service Area (BSA) in a wireless section of the wireless LAN system which is encrypted using the encryption key.

7. A wireless terminal in a wireless Local Area Network (LAN) system that is switched from a shutdown state or a standby state to an activation state in response to receiving an activation instruction via an access point from a remote management terminal, said wireless LAN system employing an encryption key that is periodically changed, said wireless terminal comprising:

a detection circuit which detects an unencrypted beacon from said access point while the wireless terminal is in the shutdown state or the standby state;

said wireless terminal is activated based on the detected unencrypted beacon;

the detected unencrypted beacon comprises patterned beacons;

said detection circuit detects the unencrypted beacon by detecting a change in a transmission interval of the patterned beacons;

a control circuit of said access point transmits the unencrypted beacon at a predetermined regular rate during a normal mode of operation;

said control circuit transmits the activation instruction to said wireless terminal by changing the transmission interval of said unencrypted beacon;

said unencrypted beacon is a frame for transmitting a Service Set Identifier (SSID) of a Basic Service Area (BSA) in a wireless section of the wireless LAN system which is encrypted using the encryption key.

8. The wireless terminal according to claim 7, wherein said detection circuit is disposed in a wireless module that is active when said wireless terminal is in said shutdown state or said standby state.

9. The wireless terminal according to claim 8, wherein said wireless module receives beacons without making a connection request to said access point or another access point of a roaming destination even if any one of reconnection and roaming occurs in the connection to said access point, when said wireless terminal is in either said shutdown or standby state.

10. An activation control method for use with a wireless Local Area Network (LAN) system for activating a wireless terminal which is in a shutdown state or a standby state, the wireless LAN system employing an encryption key that is periodically changed, the activation control method comprising:

receiving a first activation instruction at an access point transmitted from a remote management terminal;

in response to receiving the transmitted first activation instruction from the remote management terminal, transmitting a second activation instruction from said access point to said wireless terminal while the wireless terminal is in the shutdown state or the standby state;

the second activation instruction comprising an unencrypted beacon;

said unencrypted beacon is transmitted from said access point to said wireless terminal at a predetermined regular rate during a normal mode of operation;

said transmitting the second activation instruction comprises changing a transmission interval of said unencrypted beacon;

said unencrypted beacon is a frame for transmitting a Service Set Identifier (SSID) of a Basic Service Area (BSA) in a wireless section of the wireless LAN system which is encrypted using the encryption key.

11. The activation control method according to claim 10, further comprising:

detecting, by a wireless module in said wireless terminal, the transmitted second activation instruction based on the changed transmission interval.

12. The activation control method according to claim 11, wherein said detecting comprises, in response to detecting the second activation instruction from the access point, transmitting a third activation instruction to said wireless terminal.

13. The activation control method according to claim 11, wherein the detecting is performed by the wireless module that is active when said wireless terminal is in said shutdown state or said standby state.

14. The activation control method according to claim 13, wherein said wireless module receives beacons without making a connection request to said access point or another access point of a roaming destination even if any one of reconnection and roaming occurs in the connection to said wireless access point, if said wireless terminal is in either said shutdown or standby state.

* * * * *